US007797373B1

(12) United States Patent
Berger

(10) Patent No.: US 7,797,373 B1
(45) Date of Patent: Sep. 14, 2010

(54) SYSTEM AND METHOD FOR PROMOTING INTELLECTUAL PROPERTY

(76) Inventor: Martin S Berger, 217 9th St., Pittsburgh, PA (US) 15222-3506

( * ) Notice: Subject to any disclaimer, the term of this patent is extended or adjusted under 35 U.S.C. 154(b) by 0 days.

(21) Appl. No.: 09/518,699

(22) Filed: Mar. 3, 2000

(51) Int. Cl.
*G06F 15/16* (2006.01)
*G06Q 30/00* (2006.01)

(52) U.S. Cl. ............................ 709/203; 709/219; 707/3; 705/1

(58) Field of Classification Search ................... 705/27, 705/34, 30, 1, 8, 10; 707/1, 3, 5, 10, 100, 707/192; 709/201, 203, 217, 219, 223, 230; 716/1
See application file for complete search history.

(56) References Cited

U.S. PATENT DOCUMENTS

| | | | | |
|---|---|---|---|---|
| 4,603,232 | A * | 7/1986 | Kurland et al. ........... | 379/92.04 |
| 5,278,751 | A * | 1/1994 | Adiano et al. ............ | 705/10 |
| 5,410,598 | A * | 4/1995 | Shear ...................... | 705/53 |
| 5,680,305 | A * | 10/1997 | Apgar, IV ............... | 705/10 |
| 5,758,328 | A * | 5/1998 | Giovannoli .............. | 705/26 |
| 5,794,207 | A | 8/1998 | Walker et al. | |
| 5,794,210 | A * | 8/1998 | Goldhaber et al. ...... | 705/14 |
| 5,818,955 | A | 10/1998 | Smithies et al. | |
| 5,819,092 | A | 10/1998 | Ferguson et al. | |
| 5,911,131 | A * | 6/1999 | Vig .......................... | 705/1 |
| 5,915,243 | A * | 6/1999 | Smolen .................... | 705/14 |
| 5,917,912 | A * | 6/1999 | Ginter et al. ............. | 713/187 |
| 5,950,173 | A * | 9/1999 | Perkowski ............... | 705/26 |
| 5,970,467 | A * | 10/1999 | Alavi ...................... | 705/10 |
| 5,970,477 | A * | 10/1999 | Roden ..................... | 705/32 |
| 5,991,751 | A | 11/1999 | Rivette et al. | |
| 5,991,876 | A * | 11/1999 | Johnson et al. .......... | 726/28 |
| 5,995,943 | A * | 11/1999 | Bull et al. ................ | 705/14 |
| 5,999,907 | A * | 12/1999 | Donner .................... | 705/1 |
| 6,006,332 | A * | 12/1999 | Rabne et al. ............. | 713/201 |
| 6,009,407 | A * | 12/1999 | Garg ....................... | 705/10 |
| 6,014,644 | A * | 1/2000 | Erickson ................. | 705/37 |
| 6,018,714 | A * | 1/2000 | Risen, Jr. et al. ........ | 705/4 |

(Continued)

OTHER PUBLICATIONS

U.S. Census Bureau, North American Industry Classification System (NAICS), 1 pp., 2002.

(Continued)

*Primary Examiner*—Andrew Joseph Rudy
(74) *Attorney, Agent, or Firm*—Gardere Wynne Sewell, LLP

(57) ABSTRACT

A method and system for the online promotion of intellectual property includes providing an Internet host station with at least one database that is connectable via the Internet to consumer stations and industry stations. The database includes a plurality of intellectual property items and a description of each intellectual property item. At least one of the intellectual property items is selected by a consumer station and the description associated with the selected intellectual property item is viewed at the consumer station. Portions of the description may be confidential and therefore not normally viewed at the consumer station. Feedback data is sent from the consumer station to the host station. The feedback data includes consumer opinion information of the selected intellectual property item based at least in part on the description of the selected intellectual property item. The feedback data is then accessed from an industry station to thereby determine the interest in the selected intellectual property item based on the consumer opinion.

8 Claims, 9 Drawing Sheets

U.S. PATENT DOCUMENTS

| | | | | |
|---|---|---|---|---|
| 6,049,801 | A * | 4/2000 | Whitmyer, Jr. | 707/10 |
| 6,049,811 | A * | 4/2000 | Petruzzi et al. | 707/507 |
| 6,064,979 | A * | 5/2000 | Perkowski | 705/26 |
| 6,078,901 | A * | 6/2000 | Ching | 705/35 |
| 6,110,227 | A * | 8/2000 | Marcelais et al. | 717/170 |
| 6,141,685 | A * | 10/2000 | Iwamoto | 709/224 |
| 6,141,754 | A * | 10/2000 | Choy | 713/200 |
| 6,154,725 | A * | 11/2000 | Donner | 705/1 |
| 6,157,947 | A * | 12/2000 | Watanabe et al. | 709/217 |
| 6,161,101 | A * | 12/2000 | Guinta et al. | 706/45 |
| 6,169,986 | B1 * | 1/2001 | Bowman et al. | 707/5 |
| 6,219,680 | B1 * | 4/2001 | Bernardo et al. | 715/501.1 |
| 6,233,564 | B1 * | 5/2001 | Schulze, Jr. | 705/1 |
| 6,236,975 | B1 * | 5/2001 | Boe et al. | 705/7 |
| 6,236,991 | B1 * | 5/2001 | Frauenhofer et al. | 707/6 |
| 6,304,854 | B1 * | 10/2001 | Harris | 705/27 |
| 6,321,205 | B1 * | 11/2001 | Eder | 705/7 |
| 6,330,547 | B1 * | 12/2001 | Martin | 705/38 |
| 6,339,767 | B1 * | 1/2002 | Rivette et al. | 707/2 |
| 6,363,314 | B1 * | 3/2002 | Hafner et al. | 701/104 |
| 6,393,406 | B1 * | 5/2002 | Eder | 705/7 |
| 6,427,132 | B1 * | 7/2002 | Bowman-Amuah | 703/22 |
| 6,499,056 | B1 * | 12/2002 | Kitamura et al. | 709/213 |
| 6,505,172 | B1 * | 1/2003 | Johnson et al. | 705/27 |
| 6,529,878 | B2 * | 3/2003 | De Rafael et al. | 705/14 |
| 6,549,894 | B1 * | 4/2003 | Simpson et al. | 707/1 |
| 6,556,992 | B1 * | 4/2003 | Barney et al. | 707/6 |
| 6,615,195 | B1 * | 9/2003 | Chittipeddi | 705/400 |
| 6,658,391 | B1 * | 12/2003 | Williams et al. | 705/10 |
| 6,662,178 | B2 * | 12/2003 | Lee | 707/3 |
| 6,694,331 | B2 * | 2/2004 | Lee | 707/104.1 |
| 6,712,702 | B2 * | 3/2004 | Goldberg et al. | 463/42 |
| 6,718,551 | B1 * | 4/2004 | Swix et al. | 725/32 |
| 6,728,963 | B1 * | 4/2004 | Forin et al. | 719/310 |
| 6,804,663 | B1 * | 10/2004 | Delo | 707/3 |
| 6,829,743 | B1 * | 12/2004 | Hongu et al. | 715/503 |
| 6,934,918 | B2 * | 8/2005 | Hashizume et al. | 716/1 |
| 7,016,851 | B1 * | 3/2006 | Lee | 705/1 |
| 7,016,852 | B1 * | 3/2006 | Lee | 705/1 |
| 7,024,393 | B1 * | 4/2006 | Peinado et al. | 705/59 |
| 7,028,304 | B1 * | 4/2006 | Weinberger et al. | 719/310 |
| 7,127,405 | B1 * | 10/2006 | Frank et al. | 705/1 |
| 7,136,838 | B1 * | 11/2006 | Peinado et al. | 705/59 |
| 7,143,066 | B2 * | 11/2006 | Shear et al. | 705/54 |
| 7,188,069 | B2 * | 3/2007 | Hagelin | 705/1 |
| 7,194,490 | B2 * | 3/2007 | Zee | 707/204 |
| 7,216,100 | B2 * | 5/2007 | Elliott | 705/36 R |
| 7,228,288 | B2 * | 6/2007 | Elliott | 705/35 |
| 7,269,566 | B2 * | 9/2007 | Elliott | 705/1 |
| 7,295,931 | B1 * | 11/2007 | Helson | 702/19 |
| 7,308,413 | B1 * | 12/2007 | Tota et al. | 705/7 |
| 7,343,321 | B1 * | 3/2008 | Hill et al. | 705/26 |
| 7,346,518 | B1 * | 3/2008 | Frank et al. | 705/1 |
| 7,346,605 | B1 * | 3/2008 | Hepworth et al. | 707/3 |
| 7,386,460 | B1 * | 6/2008 | Frank et al. | 705/1 |
| 7,389,239 | B1 * | 6/2008 | Frank et al. | 705/1 |
| 7,406,425 | B1 * | 7/2008 | Frank et al. | 705/1 |
| 7,430,528 | B2 * | 9/2008 | Perkowski | 705/27 |
| 7,437,471 | B2 * | 10/2008 | Hohmann et al. | 709/230 |
| 7,523,072 | B2 * | 4/2009 | Stefik et al. | 705/59 |
| 2002/0052774 | A1 * | 5/2002 | Parker et al. | 705/10 |

OTHER PUBLICATIONS

U.S. Census Bureau, Standard Industry Classification (SIC) System, 1 pp., 2002.
US 5,909,942, 06/1999, Payne et al. (withdrawn)*

* cited by examiner

| Control No. | IP Type | Title | SIC Code | Customer Name | Customer Address | General Info. | Image File Name | Detailed Info. | Legal Status | Production Status |
|---|---|---|---|---|---|---|---|---|---|---|
| 135564 | Patent | Improved Mower Blade | 3524 | John Doe | 555 Walnut, town, State | Mulches grass and aerates lawn in one pass | 135564.TIF | Blade replaces conventional... | Patented | Working Prototype |
| 135565 | Trade Secret | Odorless Adhesive | 2891 | Jane Doe | 111 Barclay, town, State | Odorless & nontoxic adhesive for plastic. | N/A | [Not available] | N/A | Currently in Production |
| 135566 | Patent | Baseball Glove | 3949 | John Smith | 213 Amherst Rd, Anytown, State | Leather treatment eliminates break-in | 135566.BMP | Leather is pretreated with... | Patent Pending | Not in production |
| ... | ... | ... | ... | ... | ... | ... | ... | ... | ... | ... |

FIG. 3

72 — ☐ I am a consumer and want to view new products.

74 — ☐ I am an industry representative and want to view new products available for license or sale.

76 — ☐ I want to submit my intellectual property.

NAME: ⎯⎯ 84
ADDRESS: ⎯⎯ 86
TELEPHONE: ⎯⎯ 88
DATE OF BIRTH: ⎯⎯ 90
OCCUPATION: ⎯⎯ 92
HOUSEHOLD INCOME: ⎯⎯ 94
HOUSEHOLD SIZE: ⎯⎯ 96
EDUCATION LEVEL: ⎯⎯ 98

SYSTEM AND METHOD FOR PROMOTING INTELLECTUAL PROPERTY

BACKGROUND OF THE INVENTION

1. Field of the Invention

This invention relates generally to a system and method for promoting intellectual property, and more particularly to an online system and method for advertising intellectual property available for license or sale and obtaining feedback.

2. Description of the Related Art

Individual inventors lack know-how when attempting to promote, license, or market their inventions, whether or not patent protection has been granted. In many instances, the inventor may not be aware of particular companies that may be interested in new products or technology in the inventor's field of endeavor. Likewise, many companies may not be aware of inventions that are currently available for license or sale. Although many companies have invention submission procedures for considering ideas developed elsewhere, it is often difficult for the inventor to locate those companies. Even when appropriate companies are found, the inventor may not be properly skilled or have the necessary tools to present the invention in an attractive manner to the potential licensee or buyer. In addition, most inventors lack the expertise or cannot afford the costs associated with conducting marketing research to demonstrate that the invention is a desirable product.

In an effort to match industry with patented technology and other intellectual property, websites advertising available patents and other intellectual property for license or sale have recently appeared. One such website is known as PatentAuction.com™, wherein an intellectual property owner can display his or her invention, trademark, or copyrighted material for a fee and commission upon license or sale. This website currently offers a menu with predefined search items that can be selected by a browser, as well as a key word search for the desired property. Before making a bid on a desired item, a prospective buyer must first register and receive a bidder ID and password.

Another website for marketing inventions is known as IPMarketPlace™ at www.ipmarketplace.com. This website also displays intellectual property for sale or license. A menu is offered for finding available intellectual property and includes the following predefined categories: internet applications, entertainment, software/electronics, electrical/mechanical, and chemical/mechanical.

Although these websites may attempt to present available intellectual property to buyers or licensees, they do not provide information in a user-friendly manner. The intellectual property is not "packaged" and presented in its best light. There is no methodology for locating inventions by well known industry codes. Very little information is given about the market applications of the product and there is no information regarding market research or consumer feedback.

SUMMARY OF THE INVENTION

It is therefore an object of the present invention to provide a system and method for promoting intellectual property that overcomes at least some of the disadvantages of the prior art.

It is a further object of the invention to provide consumer feedback on intellectual property available for consideration by industry or industry representatives to package and present intellectual property in its best light like a resume.

It is an even further object of the invention to provide general details of available intellectual property to the consumer, and confidential details under appropriate agreements to the industry or industry representatives interested in the intellectual property.

According to one embodiment of the invention, a method of promoting intellectual property comprises providing a host station having at least one database. The at least one database includes a plurality of intellectual property items and a description of each intellectual property item. At least one of the intellectual property items is selected by a consumer station. The description associated with the selected intellectual property item is accessed from the consumer station. Feedback is sent from the consumer station to the host station. The feedback data includes consumer opinion information of the selected intellectual property item based at least in part on the description of the selected intellectual property item. The feedback data is then accessed from an industry station to thereby determine interest in the selected intellectual property item based on the consumer opinion.

According to a further embodiment of the invention, a method for promoting intellectual property online comprises providing a host station having an Internet site and at least one database accessible at the interne site, with the at least one database including a plurality of intellectual property items and a description of each intellectual property item. The description has at least one general description item and at least one confidential description item. One of the intellectual property items is selected by a consumer station connected to the host station and the at least one general description item associated with the selected intellectual property item is viewed at the consumer station. The same intellectual property item is selected by an industry station connected to the host station and the at least one confidential description item is viewed at the industry station. The at least one confidential description item is normally unavailable for view by the consumer station.

According to an even further embodiment of the invention, a processor-based system for promotion of intellectual property comprises a host station having at least one database with a plurality of intellectual property items and a description of each intellectual property item. Means are provided for selecting one of the intellectual property items and accessing the description associated with the selected intellectual property item by a consumer station, and for sending feedback data from the consumer station to the host station. The feedback data includes consumer opinion information of the selected intellectual property item based at least in part on the description of the selected intellectual property item. Means are also provided for accessing the feedback data from an industry station to thereby determine interest in the selected intellectual property item based on the consumer opinion.

According to an even further embodiment of the invention, a processor-based system for promoting intellectual property comprises a host station having an Internet site and at least one database accessible at the internet site. The at least one database includes a plurality of intellectual property items and a description of each intellectual property item. The description has at least one general description item and at least one confidential description item. Means are provided for selecting one of the intellectual property items by a consumer station connected to the host station. Further means are provided for viewing the at least one general description item associated with the selected intellectual property item from the consumer station. Means are also provided for selecting the one intellectual property item by an industry station connected to the host station and for viewing the at least one confidential description item from the industry station. With this arrangement, the at least one confidential description item is normally unavailable for view by the consumer station.

Other objects and advantages of the invention will become apparent upon reading the following detailed description and appended claims, and upon reference to the accompanying drawings.

BRIEF DESCRIPTION OF THE DRAWINGS

The preferred embodiments of the present invention will hereinafter be described in conjunction with the appended drawings, wherein like designations denote like elements, and wherein:

FIG. 3 shows portions of an exemplary database for customers and intellectual property items according to the invention;

FIG. 7 shows a representative menu of options that may be selected during the registration process;

FIG. 8 shows a representative display that may be used for entering registration information.

It is noted that the accompanying drawings are intended to depict only typical embodiments of the invention and should not be considered as limiting the scope thereof. The invention will now be described in greater detail with reference to the drawings.

DETAILED DESCRIPTION OF THE PREFERRED EMBODIMENTS

Figure 1:
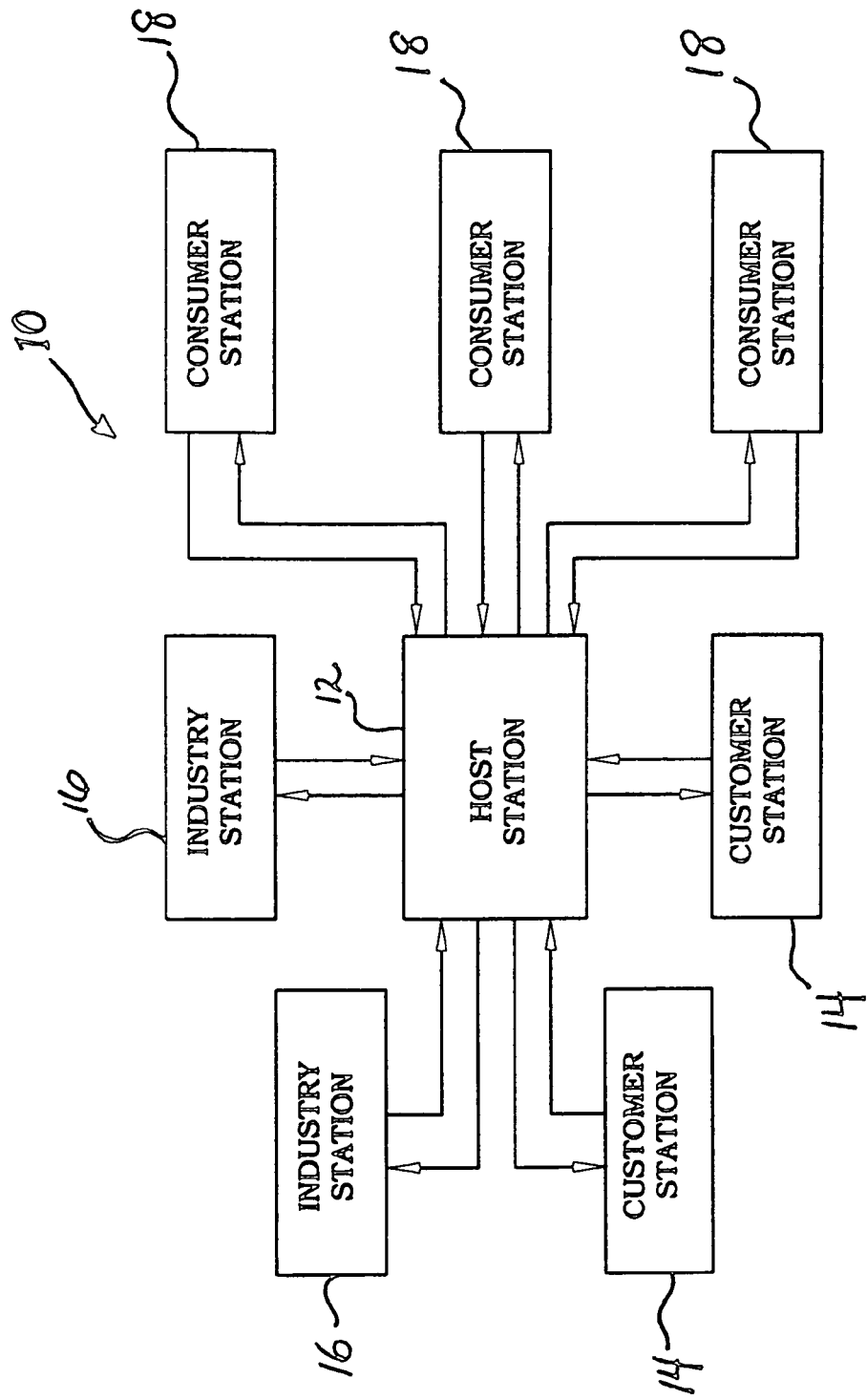
FIG. 1 is a schematic representation of an interactive system for promoting intellectual property according to the invention.

Referring now to the drawings, and to FIG. 1 in particular, a system 10 for promoting intellectual property is illustrated. The system 10 includes a host station 12 adapted for connection between a plurality of remote stations, such as customer stations 14, industry stations 16, and consumer stations 18.

In one exemplary embodiment, the host station 12 is an Internet domain site and each customer station 14, industry station 16, and consumer station 18 includes a personal computer that is connectable to the Internet in a well-known manner. Alternatively, the host station 12 may be in the form of one or more portable memory devices, such as CD-ROM's, DVD's, floppy disks, flash cards, or other memory devices currently in use or that may be developed in the future that connects to the user station through a virtual connector cable or other well known connection. Likewise, the customer, industry and consumer stations may alternatively be in the form of an interactive television device, a display telephone, or any other interactive display currently in use or that may be developed in the future. Whether the host station is an Internet site, a portable memory device, or other suitable systems or components, information relating to the intellectual property can be selectively uploaded and/or downloaded, and displayed on the customer, industry and consumer stations, as will be described in greater detail below.

As used herein, the term "intellectual property" includes, but is not limited to ideas, concepts, inventions that may be patented or patent pending, machines, products, methods, systems, trade secrets, formulations, recipes, printed matter, copyrights or copyrightable material including games, music, artwork, photography, manuscripts, plays, software, movies, videos, and slogans, designs, trade dress, trademarks, service marks, domain names, know-how, and any other inventive entity that is owned, possessed, or at least partially owned or possessed by one or more customers.

The customer station preferably includes, but is not limited to at least one customer comprising any individual, group, partnership, company, corporation, manufacturer, university, research and development facility, government agency, and/or any other entity that holds intellectual property and desires to enter into a license agreement, assignment, sale, joint venture, obtain loans, obtain venture capitol, obtain feedback, start a business, offer shares to public or private investors, and/or any other arrangement depending at least partially on the intellectual property.

The industry station preferably includes, but is not limited to, at least one industry or industry representative comprising any individual, business, group, partnership, organization, consultant, company, corporation, manufacturer, university, research and development facility, government agency, financial institution, loan officer, venture capitalist, investor, and any other entity that desires to enter into a license agreement, assignment, sale, joint venture, loan, and/or any other arrangement that involves the intellectual property, for the purpose of financing, making, selling, and/or distributing the intellectual property.

The consumer station preferably includes at least one consumer that represents any individual or entity that may potentially purchase a product or products based on the intellectual property.

Figure 2:
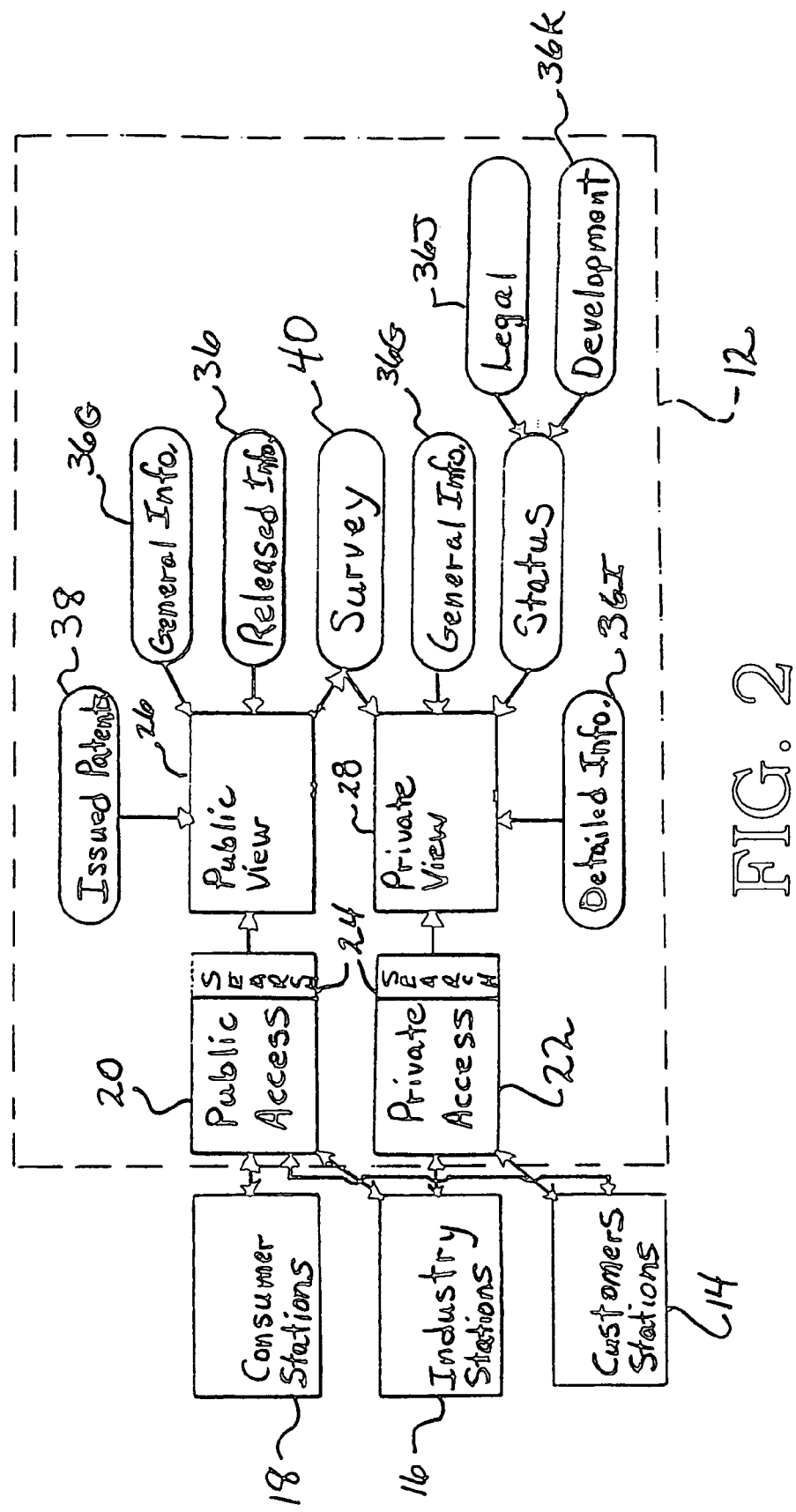
FIG. 2 is a schematic representation of the interactive system with the host station shown in greater detail.

Referring now to FIG. 2, the host station 12 includes a public access module 20 that is connectable to the industry stations 16, consumer stations 18, and customer stations 14, and a private access module 22 that is connectable to the customer stations 14 and industry stations 16. The public access module 20 and private access module 22 include a search engine 24 for searching and locating intellectual property. Preferably, a single search engine 24 is provided for both modules 20 and 22. Alternatively, a different search engine or a search engine with expanded search capabilities may be provided for the private access module 22. The public access module 20 is in turn connected to a public view module 26 and the private access module 22 is in turn connected to a private view module 28.

With additional reference to FIG. 3, the public view module 26 and private view module 28 may access one or more a databases 30 of information relating to a selected intellectual property item. The database 30 is preferably stored at the host station 12 in a secure manner to prevent file corruption. Although the database 30 may take several forms, an exemplary embodiment of the database 30 includes a table 32 with rows 34A, 34B, 34C, and so on, to 34n, where n denotes the last row of the table, and columns 36A to 36n, where n denotes the last column of the table. Each row 34A, 34B, 34C . . . 34n represents a different customer or a different intellectual property item for the same customer, while each column 36A, 36B, 36C . . . 36n represents different items of information about each customer and the intellectual property. By way of example, column 36A includes an information item labeled "Control No." that identifies a customer by a personal identification number (PIN) that may be in the form of numbers, characters, or combinations thereof. The PIN may be assigned to a customer when first registering at the host site, and may be referenced by the customer when changes need to be made to other information items, as will be described in greater detail below.

Column 36B includes an information item labeled "IP Type" that denotes the type of intellectual property item available, such as patent, trademark, trade secret, and so on, as discussed above.

Column 36C includes an information item labeled "Title" that is reflective of the intellectual property item subject matter.

Figure 4:
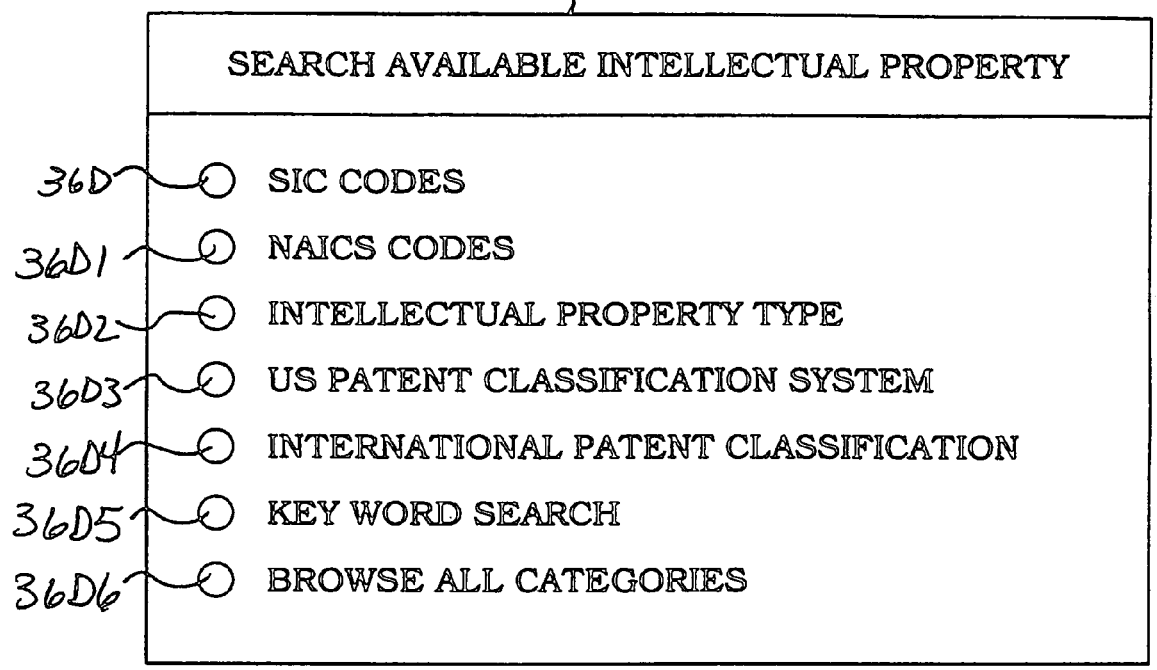
FIG. 4 depicts a representative search menu that may be accessed for conducting searches of intellectual property items.

With additional reference to FIG. 4, a search menu 35 includes information items associated with searchable terms that may be part of the database 30. By way of example, column 36D in FIG. 3 includes an information item labeled "SIC Code" that represents a standard industry category or classification for the intellectual property item. In place of or in addition to the SIC Code 36D, other columns may include further classification data such as the industry standard NAICS Code 36D1, intellectual property type 36D2, U.S. Patent Classification 36D3, International patent Classification 36D4, keywords 36D5, and/or any other identifying label that sorts intellectual property items by industry category. In this manner, one or more intellectual property items may be searched and located by selecting one or more industry categories to search, or by selecting all industry categories, as represented by 36D6.

Referring again to FIG. 3, columns 36E and 36F include customer information such as name, address, telephone number (not shown), and so on.

Column 36G includes a general information regarding the invention that does not breach any confidentiality, including but not limited to problems solved, advantages over other similar inventions, legal or patent status, e.g. patented, patent pending, etc., benefits, press releases, and so on. The general information is intended to spark the curiosity of a person at the industry and consumer stations.

Column 36H includes a file name for any images that may be present for display at the host station. The images may include drawings, virtual three-dimensional images that can be rotated about three mutually perpendicular axes, videos, photographs, and so on.

Column 36I reveals detailed information of the intellectual property item, such as construction details, process details, materials used, dimensions, parts lists, manufacturing costs, and so on.

Column 36J denotes the legal status of the intellectual property item, and may identify issued patents by number and country, patent applications applied for, status of patent applications (e.g. first office action, final office action and so on), patent claims or summary of patent claims, strength of patent claims opinion, summary of patent applications, registered trademarks and copyrights, pending court cases, and so on.

Column 36K indicates the current production status of the intellectual property item. The production status may include but is not limited to categories such as conceptual, reduced to practice, detailed drawings, mock prototype, working prototype, starting production, in full production and so on.

Finally, column 36n denotes all other columns representing items of information that may be useful in showing, describing, analyzing, studying, revising, making, selling, offering to sell, importing, exporting, and/or using the intellectual property item.

Although not shown, an audio file containing a pre-recorded voice and/or music, sound effects, and so on, for describing the intellectual property item may be provided. In addition or alternatively, a file containing a slide show of the intellectual property item may be provided.

According to an exemplary embodiment of the invention, a security access level is assigned to each information item for selectively displaying information on the public view module 26 that is not under a confidentiality agreement. For example, and with reference again to FIG. 2, it may be desirable for a consumer to view only the general information 36G of a product in order to render an informed opinion as to the desirability of the product and an acceptable price or price range. Thus, the title 36B and general information 36G may be assigned a low security level. Other information items such as patent number, drawings, detailed information, legal status, production status, and so on, may be irrelevant, overly technical or confidential, and therefore may be assigned a medium or high security level and therefore will not be displayed for view by the consumer unless previously released by the customer, as denoted by the title "Released Info" and represented by numeral 36 in FIG. 2. By way of example, it may be desirous to release more information concerning the product, whether a patent has issued or not, such as patent details 38, drawings, photographs, and the like, in order to increase the consumer's and/or industry's understanding and appreciation of the product. In this instance, the inventor would authorize the release of such information, preferably during online registration or online information changes, as will be described in greater detail below with reference to FIGS. 5 and 5A.

The public view module 26 preferably includes a survey module 40, the results of which are preferably viewed only on the private view module 28. The survey module 40 may be included in a pop-up or floating window, or may be hyperlinked to a separate Internet site or Web page. In an exemplary embodiment, the survey module includes questions that are unalterable by the viewer and a form field adjacent each question that receives input response from the consumer station. The questions may ask for information relating to the product, such as overall rating, likes, dislikes, price or price range, likelihood of purchasing the product, suggestions for improvement, and so on. The overall rating may be set up as a points system, e.g. the rating may range from one to 10, with 10 being the highest or most favorable score. Alternatively, a "thumbs-up" and "thumbs-down" rating may be implemented. For example, three thumbs up may give a most favorable rating, while three thumbs down may give a most unfavorable rating. Preferably, the survey results are tabulated for each intellectual property item (if a plurality of consumers have participated in the survey) and displayed, along with any consumer comments, at the private view module 28 for indicating the likelihood of product success. Personal details of each consumer such as age, geographic location, income level, education level, marital status, etc., is preferably obtained during a preregistration process and may also be tabulated and displayed for each intellectual property entity. The consumer need only enter the personal details once before filling out one or more surveys. In this manner, each survey can be completed in a quick and efficient manner, and consistent personal information can be linked directly to each completed survey. This particular feature is especially advantageous since the time and expense of conducting a separate marketing study by an interested industry or by the customer is substantially reduced. The interested industry may readily ascertain from the tabulated results whether the product would meet the industry's goals. Likewise, the customer may benefit from the survey results by determining whether more energy should be devoted to product development and/or intellectual property protection, as well as desirable changes to the product based on consumer comments that may make the product more marketable.

Figure 5:
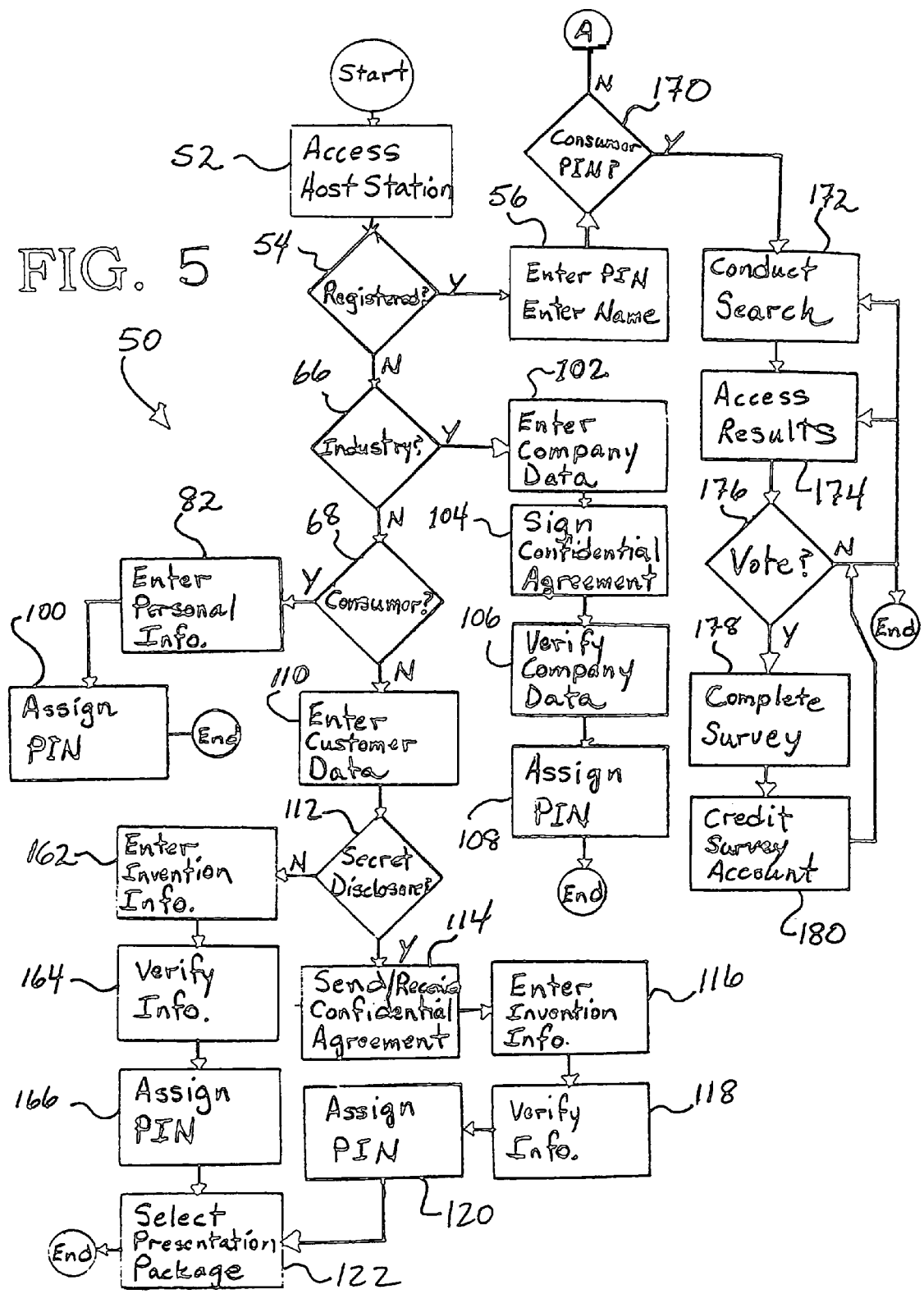
FIGS. 5 and 5A show a block diagram illustrating a method for registering and searching at the host station.
Figure 5A:
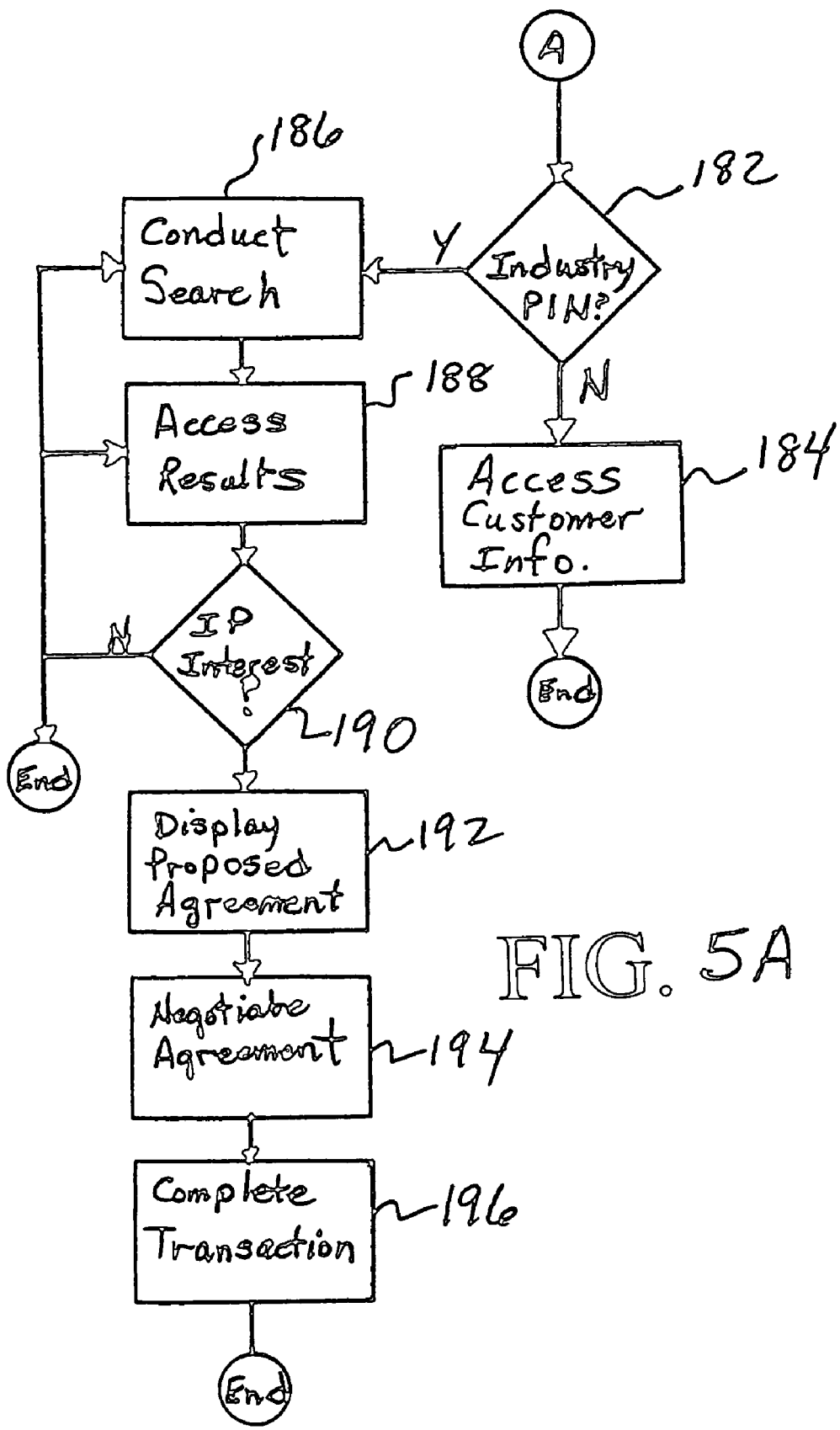

Referring now to FIGS. 5 and 5A, a method 50 for electronically promoting intellectual property is illustrated, which may be implemented in hardware, software, or a suitable combination of hardware and software, and may be more than one software system operating on a general purpose user computing platform. As used herein, a software system may be implemented as one or more separate lines of code of a software program, one or more subroutines, one or more agents, one or more objects, one or more lines of code operating on different computer platforms, or other suitable software functionality. For example, a software system may include functionality that is provided by the operating system of the computing platform, plus other application-specific functionality.

The method 50 according to an exemplary embodiment of the invention begins by accessing the host station 12 by one of the remote stations, e.g. the customer station 14, industry station 16, or consumer station 18, as represented at block 52. Preferably, the host station is accessed through an Internet connection and an Internet Service Provider (ISP). Alternatively, where the host station 12 is in the form of one or more portable memory devices, one or more files of the host station may be accessed.

Figure 6:
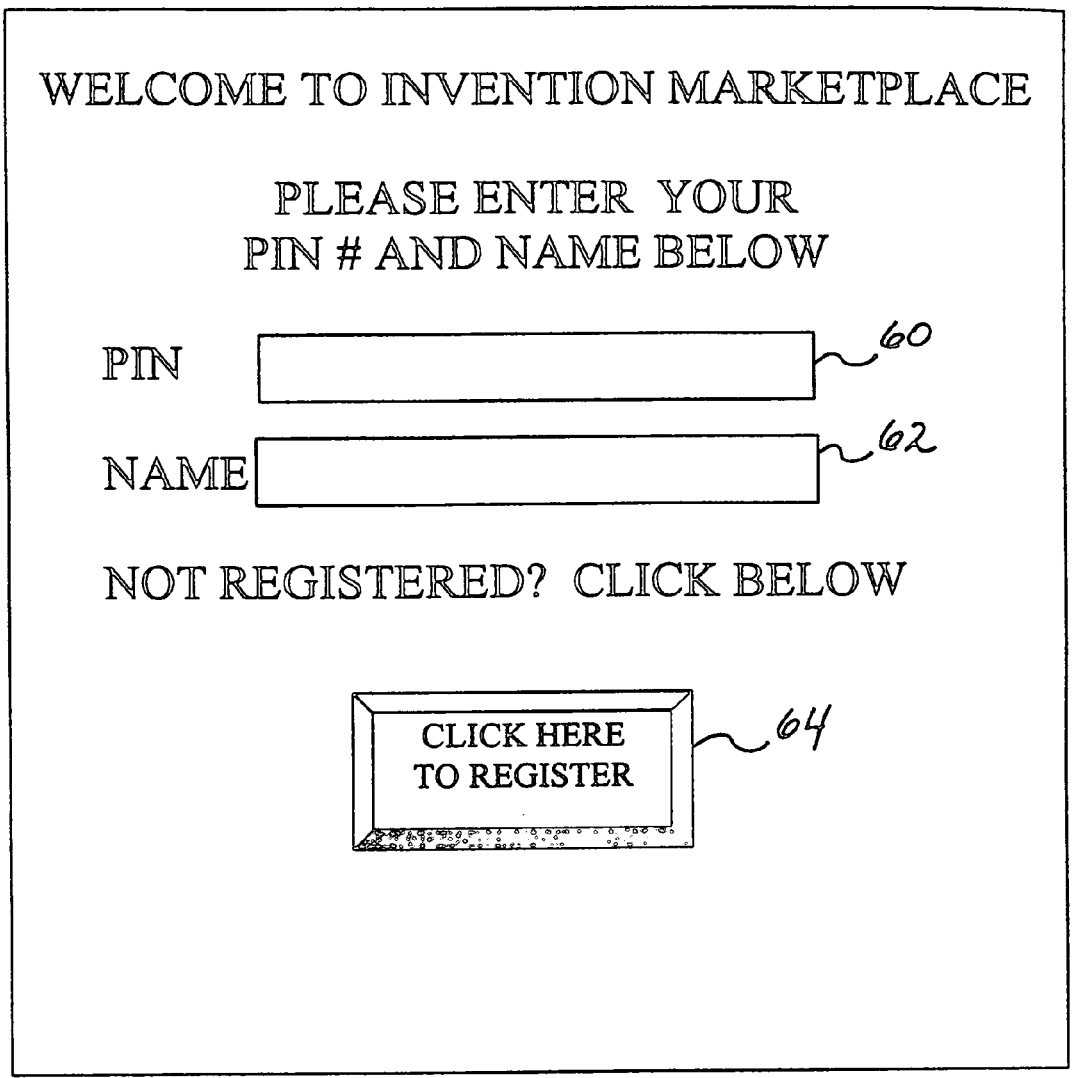
FIG. 6 shows a representative welcome menu for logging onto or registering with the host station.

At decision block 54, and with additional reference to FIG. 6, it is determined whether the remote station or user at the remote station is registered. This can be accomplished by providing a menu screen 58 asking the user to enter a personal identification number (PIN) at form field 60 and the registered name or an assigned password at form field 62 as represented by block 56 (FIG. 5), and by providing a button 64 or hyperlink for new registrations.

With further reference to FIG. 7, if the user is not registered, it is determined at decision blocks 66 and 68 (FIG. 5) what type of registration routine to perform. This can be accomplished by providing a menu screen 70 with user selectable buttons or hyperlinks 72, 74, and 76. When the button 72 is selected by the user, it is determined that the user will be registered as a consumer. When the button 74 is selected, it is determined that the user will be registered as an industry or industry representative. Likewise, when the button 76 is selected, it is determined that the user will be registered as a customer.

With additional reference FIG. 8, selection of the consumer button 72 (FIG. 7) accesses a menu 80 that prompts the user to enter personal information, as represented by block 82 (FIG. 5). In an exemplary embodiment of the invention, the consumer is prompted to enter information into a series of data fields, such as a name data field 84, one or more address data fields 86, a telephone data field 88, a birth date data field 90, an occupation data field 92, an income data field 94, a household size data field 96, and an education level data field 98. Although several data fields are provided for entering personal information, it is to be understood that the invention is not limited thereto. Other data fields may be provided, such as gender, race, buying habits, email address, and so on, depending on the type of information needed for marketing analysis or other purposes. Once all the required personal information is entered in the data fields by the consumer, a personal identification number (PIN) is assigned, as shown at block 100 (FIG. 5). The PIN may be in the form of numbers, letters, or combinations thereof, and is a unique identifier of the registered consumer. Preferably, a portion of the PIN identifies the user as a registered consumer or consumer station, so that only general and released information may be viewed, as previously discussed.

Selection of the industry button 74 (FIG. 7) accesses a menu (not shown) that prompts the user to enter industry information, as represented by block 102 (FIG. 5). The industry information menu may be similar to the menu 80 and include fields for entering industry-specific information such as company name, address, contact person or user, telephone number, industry type, experience in licensing inventions (e.g. how recently, how many, results), job title, manufacturing capability, budget, type of intellectual property interested in, type of agreement seeking (e.g. license, assignment, manufacturing, marketing, partnership, loan approval, infomercials, and so on), market areas or countries interested in, and so on. Although not shown, a menu item may be displayed for indicating whether the industry station is desirous to receive automatic E-mail notification of newly posted intellectual property items in the areas or categories that the industry station is interested in.

Once the industry information is entered, a confidentiality or nondisclosure agreement is displayed, as shown at block 104. The confidentiality agreement is designed to protect the customer's confidential disclosure. Signing the agreement may be conducted online through the provision of buttons (not shown) labeled "I ACCEPT" and "I REJECT". Alternatively, the agreement may be downloadable for printing and signing. If the industry representative refuses to sign the agreement, then the industry station may only be registered and assigned an industry PIN with the same viewing restrictions as the consumer station.

Whether or not the industry station signs the agreement, the industry information is verified to insure that the industry station is legitimate, as shown at block 106. The verification process may be accomplished by confirming that the entered telephone number is a business number, searching business directories, locating an Internet home page, verifying an E-mail address, receiving a scanned image of a business card, driver's license or business license, and/or any other verification means. To prevent fraudulent access, the registrant may be asked to post a security such as $50 or any other amount chargeable to a credit card to pay for the cost of verification if telephone numbers or other entered data cannot be confirmed. The verification process is preferably automatically conducted online, but may be manually conducted.

Once the industry station is verified, an industry PIN is assigned at block 108. As with the consumer PIN, the industry PIN may be in the form of numbers, letters, or combinations thereof, and is a unique identifier of the registered industry representative or industry station. Preferably, a portion of the PIN identifies the user as a registered industry station with a signed confidentiality agreement, so that confidential information as well as general and released information may be viewed, as previously discussed. Such information may include not only details of the intellectual property, but survey results, consumer comments, and other data pertinent to the intellectual property.

Selection of the customer button 76 (FIG. 7) accesses a menu (not shown) that prompts the user to enter customer information, as represented by block 110 (FIG. 5). The customer information menu may be similar to the consumer menu 80 and include fields for entering customer-specific information such as name 36E (FIG. 3), address 36F, telephone number, and so on. Once the customer-specific information has been entered, the user is prompted to indicate whether the intellectual property is confidential, as shown at decision block 112. If the user has confidential information, a confidentiality agreement is presented to the user for signing at block 114. Signing the agreement may be conducted online through the provision of buttons (not shown) labeled "I ACCEPT" and "I REJECT". Alternatively, the agreement may be downloadable for printing and signing. If the customer refuses to sign the agreement, then the customer receives a warning that the entry of information relating to intellectual property will not be confidential. Preferably, the agreement presented for the customer's signature is substantially similar to the agreement signed by the industry representative. Although not shown, an engagement agreement defining the relationship between the customer and host station may be provided for signing by the customer. The engagement agreement may set forth the expected duties of each party and include procedures for payment of fees, commissions, royalties, and so on. Preferably, the engagement agreement is signed by the customer prior to issuing a customer PIN.

Once the agreements have been signed by the customer, information relating to the intellectual property is entered, as shown at block 116. The information is preferably entered online, and may include one or more information items as shown in FIG. 3. The customer-specific information and the intellectual property information may then be verified, as represented by block 118 before assigning a customer PIN at block 120. The verification process may include confirmation of telephone number, receipt of a scanned driver's license, social security card, or other identification, actual ownership of the intellectual property, and other information entered by the customer. Alternatively, the verification process may take place when an industry station expresses interest in the customer's intellectual property. As with the industry PIN, the customer PIN may be in the form of numbers, letters, or combinations thereof, and is a unique identifier of the registered customer or customer station. Preferably, a portion of the customer PIN identifies the user as a registered customer station with signed confidentiality and engagement agreements, so that confidential information as well as general and released information may be shown and viewed, as previously discussed. Such information may include not only details of the intellectual property, but survey results, consumer comments, and other data pertinent to the intellectual property. The customer PIN may also authorize access to the host station for verifying the customer account status, outstanding charges, payments, changes to submitted information, changes to the selected view package, and so on, that are not authorized by either the consumer PIN or the industry PIN. After the customer PIN is assigned, the customer is prompted to select a presentation package, as shown at block 122.

Figure 9:
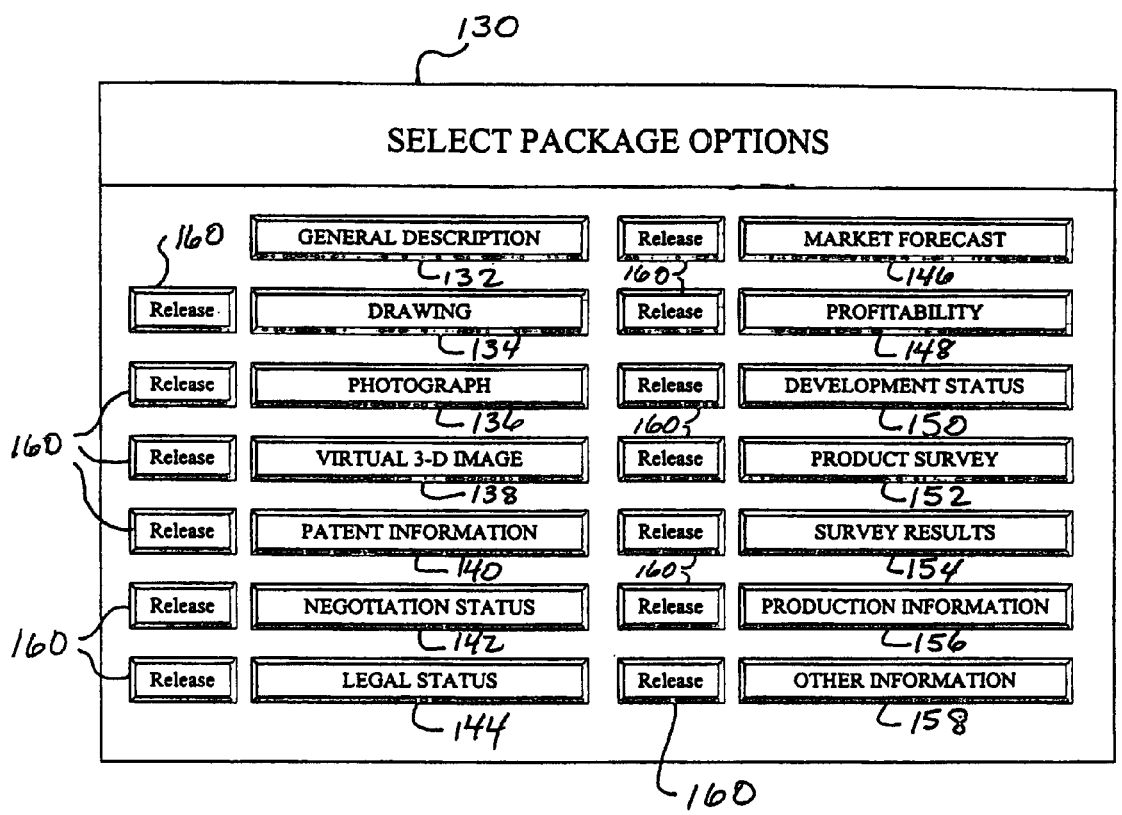
FIG. 9 illustrates a presentation package options menu that can be accessed by a customer station.

With additional reference to FIG. 9, an exemplary embodiment of a presentation selection menu 130 is illustrated. The menu 130 has a plurality of information item buttons 132-158 and a plurality of release buttons 160. One or more buttons 132-160 may be selected by the customer for displaying information items on one or both of the view modules 26, 28. By way of example, if a customer only desires to display a general description of the intellectual property item on both view modules 26, 28, only the button 132 is selected. If the customer desires to display a virtual three-dimensional image on both view modules, then the button 138 is selected, along with it's associated release button 160. Selection of the release button 160 together with its associated information item button enables the information, which may be confidential, to be displayed on the public view module 26. If an information item, such as survey results 154 is selected without selection of its associated release button 160, then the information item 154 is displayed only on the private view module 28. In this manner, the selected information items may be displayed on one or both view modules 26, 28, based on the customer's preference.

It is to be noted that the button 158 relates to one or more information items in addition to the other information items that may be associated with the intellectual property item. By way of example, the button 158 may be used to select one or more advertising packages at the host station for increasing exposure of the intellectual property item and driving consumers and industry representatives to the specific location of the customer's intellectual property item. Advertising services such as E-mail mailings, banners, mailings, and so on, may be provided.

When a customer releases confidential information for display on the public view module, a warning message may also be displayed indicating that time limits for obtaining intellectual property rights in certain countries will commence if the customer continues, and that certain intellectual property rights in other countries may be forfeited. The customer may then be given another chance to keep the released information confidential.

Each of the information items 132-158 may be associated with a fee that accumulates as each button is selected. A different fee may be associated with each button.

In an alternative arrangement, the customer may select between different packages having predetermined information items for display on one or both view modules 26, 28. By way of example, a "Patented" package may include information such as patent issue date, time remaining, type of patent, claims, drawings or other graphic representation, invention benefits, development stage, estimated sales price, market targets, and industry standard classification codes.

Turning again to FIG. 5, if the customer indicates at decision block 112 that there is no confidential information, then the information relating to the intellectual property is entered, as shown at block 162. The information is preferably entered online, and may include one or more information items such as shown in FIG. 3. Before entering the intellectual property information, the customer may receive a warning message that the entry of information relating to intellectual property will not be confidential, and that time limits will commence in certain countries for obtaining intellectual property rights while certain rights may be forfeited in other countries. The customer may then be given the choice to proceed with submitting the information as non-confidential.

The customer-specific information and the intellectual property information may then be verified, as represented by block 164 before assigning a customer PIN at block 166. The verification process may include confirmation of telephone number, actual ownership of the intellectual property, and other information entered by the customer. Alternatively, the verification process may take place when an industry station expresses interest in the customer's intellectual property. After the customer PIN is assigned, the customer may select a presentation package at block 122, as previously discussed. As previously described the customer PIN is preferably assigned after an engagement agreement is presented and signed by the customer.

When a proper PIN and name has been entered at block 56, the host station determines whether the PIN is a consumer PIN at decision block 170. If a consumer PIN has been entered, the search menu 35 (FIG. 4) may be accessed by the consumer station. Since some consumers do not have ready access to SIC and NAICS code definitions, as well as patent classification definitions, these search categories may not be displayed for selection by the consumer. Although not shown, a search category relating to intellectual property items with surveys may be part of the search menu 35. In this manner, the consumer may choose to search only for intellectual property items with surveys.

After the search term(s) and/or other search categories are entered and one or more suitable matches are found, as shown at block 172, the search results are displayed and may be accessed by the consumer station, as shown at block 174. The information available for display of selected intellectual property items at the consumer station includes general descriptive information that does not breach confidentiality, as well as non-confidential information and previously released confidential information, as discussed above.

If the survey button 152 (FIG. 9) was previously selected by the customer for the intellectual property item, then the consumer is given the option to complete the survey, as shown at decision block 176. If the consumer chooses not to complete the survey for the selected intellectual property item, then the consumer may access the previous search results, conduct a new search, or end the session. If the consumer chooses to complete the survey, then the online survey form is filled out, as shown at block 178. When more than one consumer completes the survey for the intellectual property item, the results can be tabulated and displayed on the public and/or private view modules, depending on the customer's previous selection.

As a precautionary measure, the consumer PIN and/or name may be associated with the survey results and compared to a newly selected survey to determine if the consumer had previously completed the survey for the same intellectual property item. In this manner, only one survey per available intellectual property item can be filled out by each consumer. Since some customers may desire to enhance the survey results through multiple voting on the customer's own intellectual property item, this measure ensures that the tabulated survey results remain unskewed. In a preferred arrangement, an upper limit to the number of surveys for a given intellectual property item can be preset by the host station or preselected by the customer. For example, one customer may desire to pay for only 250 survey results, while another customer may desire to pay for more or less results.

Once the survey is completed, the consumer may be credited with currency, coupons, discounts, products, services, or any other incentives for filling out the survey, as shown at block 180. An account may be set up at the host station for each consumer, for recording the credit. Alternatively, an account at a consumer's financial institution may receive the credit. The consumer may then access the previous search results, conduct a new search, or end the session. With this arrangement, a consumer is encouraged and rewarded for participating in multiple surveys independent of the consumer's opinion.

With additional reference to FIG. 5A, if it is determined at decision block 170 (FIG. 5) that the PIN is not a consumer PIN, then the host station determines at block 182 whether the PIN is an industry PIN or a customer PIN. If the PIN is a customer PIN, then the customer is given access to all available information associated with the customer and the customer's intellectual property item(s), as shown at block 184, for viewing survey results, updating the description, drawings, photos, images, legal status, product status, and so on, paying account balances, requesting further services for developing or marketing the intellectual property item(s), changing information displayed on the public and private view modules, and any other action related to the intellectual property item.

If the PIN is an industry PIN, then a search may be conducted at block 186, preferably with the search menu 35 (FIG. 4) and search categories 36D-36D6. After the search categories and/or search term(s) are entered and one or more suitable matches are found, the search results are displayed and may be accessed by the industry station, as shown at block 188. The information available for display of selected intellectual property items at the industry station may include general descriptive information that does not breach confidentiality, as well as non-confidential information, previously released confidential information, and confidential information. The confidential information, including survey results, can only be accessed by industry stations that have submitted a signed confidentiality agreement, as discussed above.

Although not shown, the survey may be filled out once for each intellectual property item by the industry and consumer stations since, in a preferred embodiment, these stations also have access to the public access module 20. Feedback from industry stations is especially important for trade or industrial products that are not normally available to the consumer.

Once the intellectual property item is accessed by the industry station, it is determined at decision block 190 whether there is any interest in obtaining rights to the intellectual property item, granting loans, manufacturing, selling, or any other arrangement associated with the intellectual property item. If there is no interest, the industry representative may access the previous search results, conduct a new search, or end the session. If there is interest in the intellectual property item, an agreement between the customer station and industry station is negotiated at block 194, and the transaction is completed at block 196, including any commissions payable to the host station. The agreement and transaction can both be completed online or through telephone conferencing, personal interviews, and so on. According to an exemplary embodiment of the invention, proposed bids may be displayed at the host station for the intellectual property item(s) of interest for a predetermined time period, or until the negotiations are completed.

While the invention has been taught with specific reference to the above-described embodiments, those skilled in the art will recognize that changes can be made in form and detail without departing from the spirit and the scope of the invention. Thus, the described embodiments are to be considered in all respects only as illustrative and not restrictive. The scope of the invention is, therefore, indicated by the claims rather than by the foregoing description. All changes that come within the meaning and range of equivalency of the claims are to be embraced within their scope.

The embodiments for which an exclusive property or privilege is claimed are defined as follows:

1. A computer implemented system promoting inventions over the Internet communications network, the system comprising:
   a host computer station constituting an Internet domain site connected to said communications network and having a database with stored descriptions of respective inventions and their distinctive features;
   a publicly accessible interface in communication with the host computer station and in communication with plural consumer computer stations via the communications network;
   a first computer program module at said host computer station selecting at least one of said inventions by reference to the stored invention descriptions and distinctive features for viewing at said plural consumer computer stations and thereafter receiving feedback data relating to a consumer desirability of the selected inventions, wherein said first computer program module includes a survey module eliciting said feedback data from multiple users of the consumer computer stations by posing one or more questions to said users regarding said consumer desirability of products incorporating the selected inventions and consolidating their responses;

a second computer program module receiving said consolidated responses at said host computer station to provide an information summary of the consumer desirability for the respective selected inventions;

a restricted access interface in communication with the host computer station and in communication with plural industry computer stations via the communications network, wherein users of said industry computer stations are specifically identified by said host computer station as authorized to access said information summary; and a computer program module transferring said information summary to said authorized industry computer stations but not to said consumer computer stations.

2. The computer implemented system of claim 1, wherein:

said first computer program module searches a desired grouping of inventions having at least one common feature prior to selecting said at least one invention.

3. The computer implemented system according to claim 2, wherein:

said at least one common feature is one of a Standard Industrial Classification code and a North American Industry Classification System code.

4. The computer implemented system according to claim 1, wherein:

said at least one database further includes at least one confidential information description of said inventions, respectively.

5. The computer implemented system according to claim 4, including:

a third computer program module operable to provide said one confidential information description to be viewable only by selected ones of said industry computer stations.

6. A computer implemented system for obtaining informed consumer opinions over a communications network regarding the commercial attractiveness of customer inventions, comprising:

a host computer station connected to said communications network and having a database storing identification of customers and descriptions of respective inventions of said customers, including distinctive features of said inventions;

a publicly accessible interface in communication with the host computer station and in communication with plural customer computer stations via the communications network, the users of said customer computer stations being customers who own respective proprietary interests in said inventions;

the publicly accessible interface being in communication with the host computer station and in communication with plural consumer computer stations via the communications network, users of said consumer computer stations being consumers who constitute potential purchasers of products incorporating said inventions;

a first computer program module enabling respective customer identifications and descriptions of their inventions, including the distinctive features of said inventions, from each of said customers to be received and stored in said database;

a second computer program module (i) enabling access by said consumers at said plural consumer computer stations to said inventions by reference to the stored invention description, (ii) thereafter receiving feedback data relating to a commercial attractiveness of products incorporating the selected inventions, said second computer program module including a survey module eliciting said feedback data from multiple ones of the consumer computer stations by posing one or more questions regarding said commercial attractiveness of products incorporating the selected inventions and responding to answers thereto constituting such feedback data, and (iii) thereafter consolidating said answers to provide respective information summaries regarding the commercial attractiveness of the selected inventions; and a third computer program module receiving said information summaries at said host computer station for storage in the database;

a restricted access interface in communication with the host computer station and in communication with plural industry computer stations via the communications network, users of said industry computer stations being involved with commercial transactions regarding said inventions, wherein the users of said industry computer stations are specifically identified by said host computer station as authorized to access said information summaries; and a fourth computer program module transferring said information summaries to said industry computer stations but not to said consumer computer stations.

7. The computer implemented system of claim 6 in which said first computer program module additionally enables the storage in said database of information pertaining to the legal protection status of said inventions.

8. A computer implemented system promoting inventions over the Internet communications network, the system comprising:

a host computer station connected to said communications network and having a database with stored invention information, including confidential invention information and non-confidential invention information;

a restricted access interface in communication with the host computer station and in communication with at least one industry computer station via the communications network;

a computer program enrollment module enrolling an industry representative user of said industry computer station as an industry representative wishing to access the confidential invention information, wherein said enrollment module conditions such access upon the industry representative executing a confidentiality agreement regarding the confidential invention information; and a computer program invention disclosure module selectively granting the industry representative user access to said confidential invention information upon execution by the industry representative user of the confidentiality agreement but not to other users.

* * * * *